Sept. 5, 1933.  H. W. NORGAARD  1,925,273
FEEDER FOR CAN FILLING APPARATUS
Filed Sept. 18, 1931
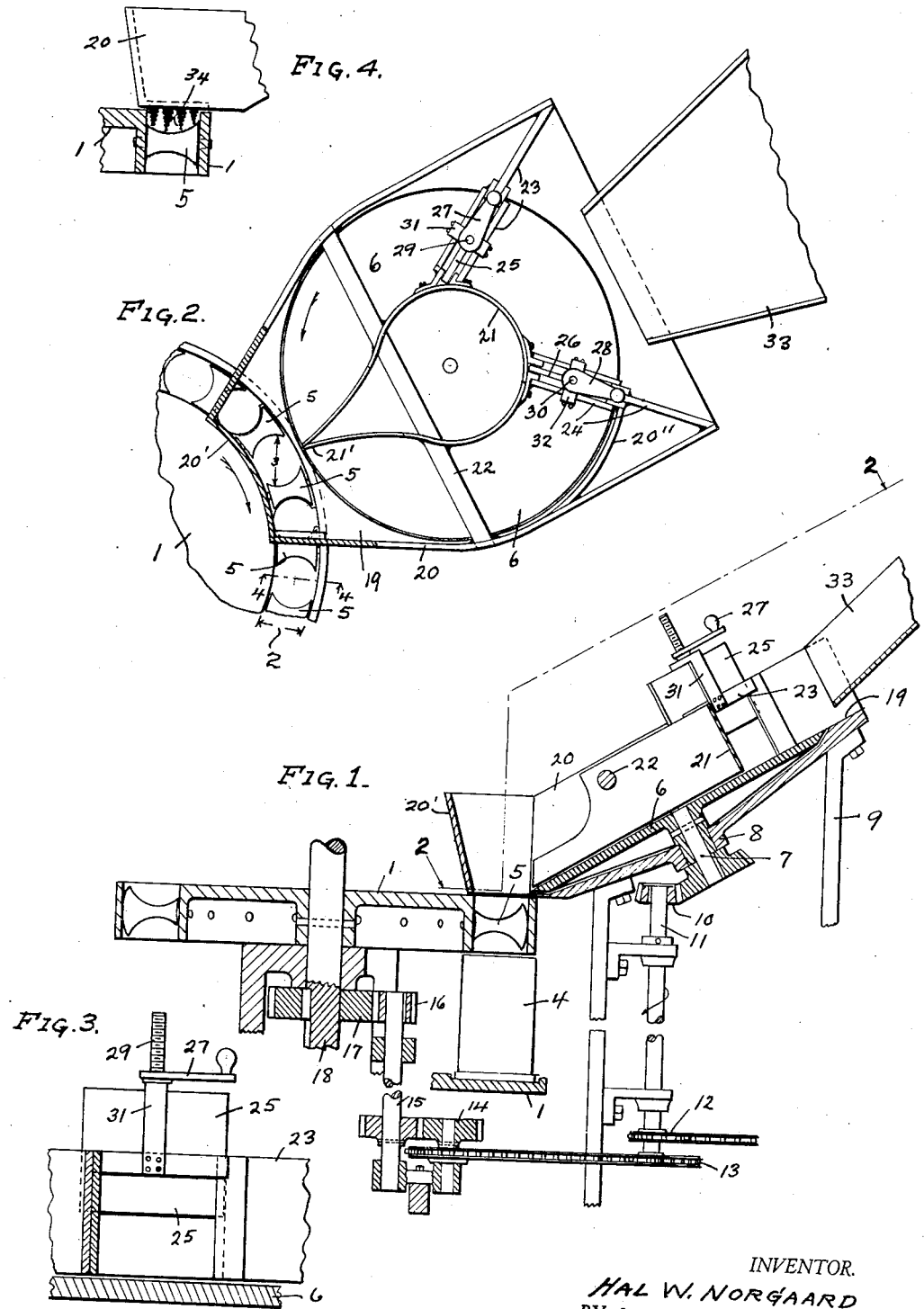
INVENTOR.
HAL W. NORGAARD
BY
*Miller Boyken & Bried*
ATTORNEYS Patented Sept. 5, 1933

1,925,273

UNITED STATES PATENT OFFICE 1,925,273

FEEDER FOR CAN FILLING APPARATUS

Hal W. Norgaard, Oakland, Calif.

Application September 18, 1931
Serial No. 563,477

10 Claims. (Cl. 226—96)

This invention relates to apparatus for feeding materials to containers and in particular to apparatus for feeding fruits and vegetables to can filling machines in canneries.

The objects of the invention are to provide an improved feeder for the purpose mentioned which will continuously feed a traveling row of cans and return any surplus to the feeding stream for the new cans being presented.

In the drawing Fig. 1 accompanying this application is a vertical section of my feeder shown in relation to a rotary can conveyor or filling table.

Fig. 2 is a plan view of the feeder as seen along the line 2—2 of Fig. 1.

Fig. 3 is an enlarged side view of one of the control gates.

Fig. 4 is a detail taken along the line 4—4 of Fig. 2.

Before describing the feeder proper, it should be noted that it may be used to feed material to cans passing along on any kind of a conveyor, but is here shown as positioned adjacent a rotary can table of the type described and claimed in my copending patent application filed under Serial No. 396,113 on Sept. 13, 1929.

In the drawing only enough of the can table is shown to show the relation of the feeder, the table is designated 1 and it has a concaved channel 2 around its marginal edge provided with round spaced apertures 3 under each of which is supported a can 4 to be filled as it rotates past the feeder, and adjacent opposite sides of each opening are concave rollers 5 both outwardly rotated (by means not shown) in a direction to force fruit or vegetables which may be in the trough into the openings 3 and cans below as the table revolves, all as described in my copending patent application before mentioned.

The feeder proper consists of a flat disk 6 arranged at an angle of about thirty degrees from the horizontal, and with its under edge beveled and close to or just above the edge of table 1. This disk is mounted for rotation on a shaft 7 supported in a bearing 8 from frame 9 of the machine, and provided with suitable reduction gears or power-transmitting elements 10 to 16 inclusive rotatably connecting a gear 17 on shaft 18 of can table 1 so that the table and the feeder disk will rotate in direction of the arrows of Fig. 2 and with the feeder disk traveling at a slower rate of speed.

Around the edge of the feeder disk and forming substantially a stationary continuation of its surface is a plate 19 provided with walls 20 along two sides extending in a converging manner over the can table and along the inner line of the fruit channel as at 20′, while at the side where the disk rotates away from the table the wall follows the curve of the disk as at 20″. A central partly circular wall 21 divides the disk into a circular path with one side traveling toward the can table and the other side traveling away from it. This central wall is extended over the disk and terminates in a point 21′ adjacent the can table, and is rigidly positioned just above the disk and supported from the outer wall as by a suitable bar 22 as well as by certain framing 23, 24 extending from plate 19 over the disk and forming the mountings for two sliding gates 25, 26 which may be accurately adjusted in height above the disk by means of hand screw levers 27, 28 working respectively on threaded rods 29, 30 extending upward from their respective gates through yokes 31, 32.

In operation, fruit or vegetables properly peeled, halved, or otherwise cut up and prepared for canning, is passed (under suitable control not shown) down chute 33 to the upper part of the slanted rotating feeder disk 6 and is carried down the far side of the disk in a stream depending on the setting of gate 25 to the channel in the can table over the cans so as to pass through the can openings as they come around, being aided by the rotating concave rollers 5 while the surplus is constantly brushed back by a depending brush 34 and as it accumulates is forced upon the ascending margin of disk 6 to be carried upward thereon and under suitably raised gate 26 for descent again on the other margin of the disk for repetition of the cycle.

By this means it will be seen that the fruit is constantly delivered to the traveling cans in an amount a little more than necessary so as to insure completely filling each one, yet any surplus is carried back again for recycling.

In considering my invention it will be evident that it is applicable to any moving row of containers or openings thereover whether traveling in a straight or circular path, and for feeding any class of material, as the size of the feeder disk, its speed of rotation, may be changed to suit, and its angle of delivery may be lowered until substantially horizontal, all depending on the nature of the material being fed.

I therefore claim:—

1. Feeding apparatus for can filling machines comprising a rotatable disk with one edge positioned adjacent the point to which the material is to be fed, means for rotating the disk, means for delivering material on the disk for feeding, a wall guiding the material along one margin and off the edge of the disk to said point, and a wall guiding surplus material back onto the disk for recycling thereover.

2. Feeding apparatus for can filling machines comprising a rotatable disk with one edge positioned adjacent the point to which the material is to be fed, means for rotating the disk, means for delivering material on the disk for feeding, a wall guiding the material along one margin to said point, and a wall guiding surplus material back to the disk for recycling thereover, said last mentioned wall extending beyond said disk to embrace an area including the point to which the material is to be fed, and means providing a support for the material within the area embraced by said wall except at said point.

3. Feeding apparatus for can filling machines comprising a rotatable disk with one edge positioned adjacent the point to which the material is to be fed, means for rotating the disk, means for delivering material on the disk for feeding, a wall guiding the material along one margin and off the edge of the disk to said point, a wall guiding surplus material back onto the disk for recycling thereover, and means for regulating the amount of material passing over said margin to the feeding point.

4. Feeding apparatus for can filling machines comprising a rotatable disk with one edge positioned adjacent the point to which the material is to be fed, means for rotating the disk, means for delivering material on the disk for feeding, a wall guiding the material along one margin to said point, a wall guiding surplus material back to the disk for recycling thereover, and means for regulating the amount of material passing over said margin to the feeding point and from said point in recycling.

5. Feeding apparatus for can filling machines comprising a rotatable disk with one edge positioned adjacent the point to which the material is to be fed, means for rotating the disk means for delivering material on the disk for feeding, a wall guiding the material along one margin to said point, a wall guiding surplus material back to the disk for recycling thereover, and a pair of gates respectively of the opposite margins of said disk controlling the movement in opposite directions of the material thereon.

6. In can filling apparatus, a feeder comprising a rotary disk arranged at an angle slanting downwardly to feed material from the disk at its lower edge, means for rotating the disk, means delivering material to the upper part of the disk, means guiding the material down one margin and off the edge of the disk for feeding therefrom, and means guiding the surplus material back to the disk for recycling to the feeding point.

7. In can filling apparatus, a feeder comprising a rotary disk arranged at an angle slanting downwardly to feed material from the disk at its lower edge, means for rotating the disk, means delivering material to the upper part of the disk, means guiding the material down one margin for feeding therefrom, means guiding the surplus material back to the disk for recycling to the feeding point, and means controlling the amount of material passing down one margin and up the other.

8. In can filling apparatus, a feeder comprising a rotary disk arranged at an angle slanting downwardly to feed material from the disk at its lower edge, means for rotating the disk, means delivering material to the upper part of the disk, means guiding the material down one margin and off the edge of the disk for feeding therefrom, and a central guard holding the central area of the disk clear and terminating in walls converging toward the discharging point of the disk.

9. In combination with a circular rotating table with can filling apertures spaced along its margin, a feeder for passing material to the can openings comprising a disk with one edge adjacent the table, means for rotating the disk, and guiding means for carrying material on the margin of said disk to said openings.

10. In a structure as specified in claim 9, and means for returning any surplus material to the leaving margin of said disk.

HAL W. NORGAARD.